W. B. CLEVELAND.
PROCESS OF BONDING RAILS.
APPLICATION FILED JUNE 12, 1909.
994,908.
Patented June 13, 1911.
2 SHEETS—SHEET 1.
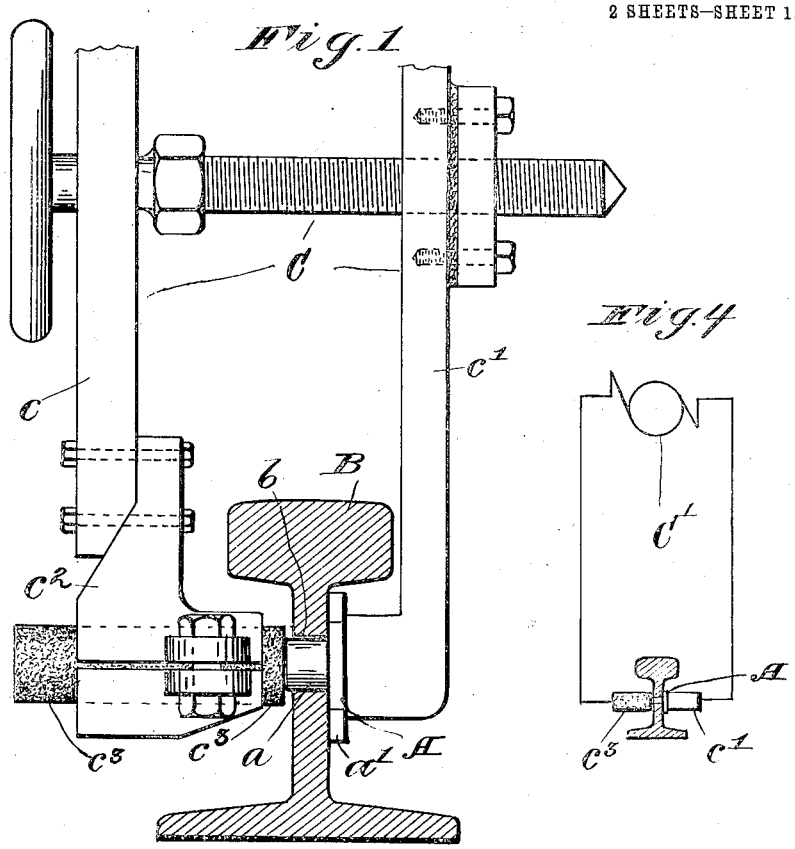
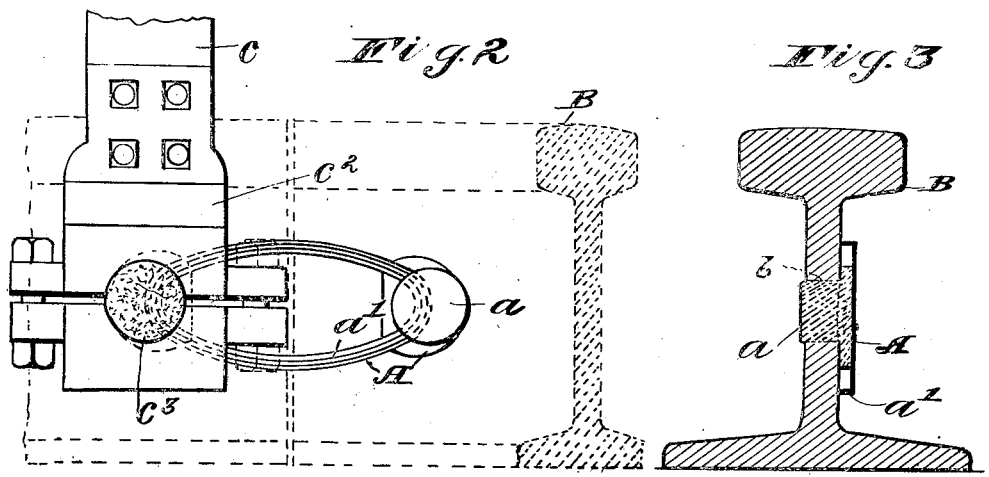
Witnesses:
J. C. Turner
Jno. F. Oberlin
Inventor:
William B. Cleveland
by J. B. Fay
Attorney.

W. B. CLEVELAND.
PROCESS OF BONDING RAILS.
APPLICATION FILED JUNE 12, 1909.
994,908.
Patented June 13, 1911.
2 SHEETS—SHEET 2.
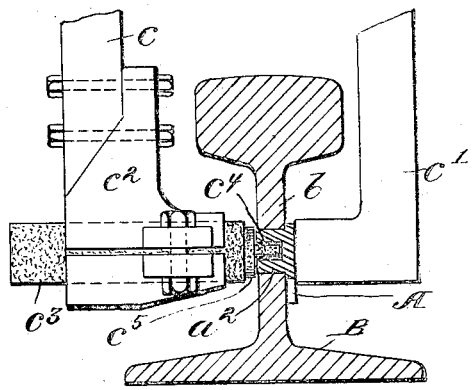
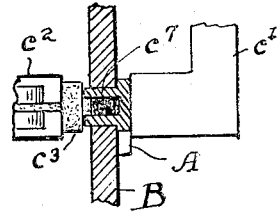
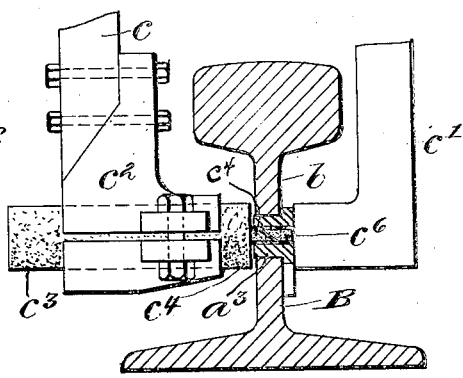
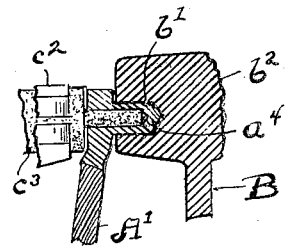
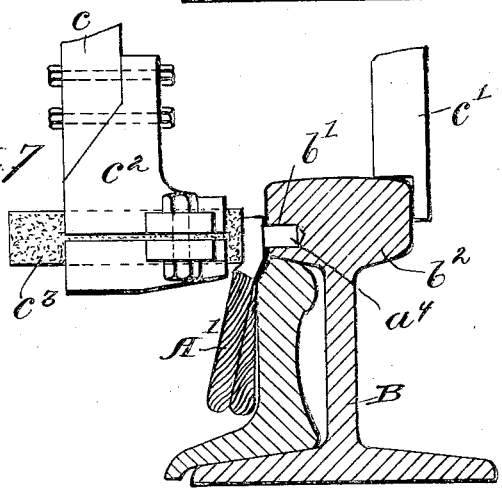
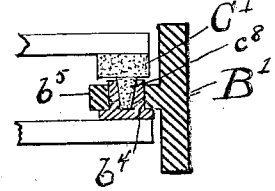
Witnesses:
Inventor:
William B. Cleveland
by J. B. Fay
Attorney

UNITED STATES PATENT OFFICE.

WILLIAM B. CLEVELAND, OF CLEVELAND, OHIO, ASSIGNOR TO THE ELECTRIC RAILWAY IMPROVEMENT COMPANY, OF CLEVELAND, OHIO, A CORPORATION OF OHIO.

PROCESS OF BONDING RAILS.

994,908. Specification of Letters Patent. Patented June 13, 1911.

Application filed June 12, 1909. Serial No. 501,700.

*To all whom it may concern:*

Be it known that I, WILLIAM B. CLEVELAND, a citizen of the United States, resident of Cleveland, county of Cuyahoga, and State of Ohio, have invented a new and useful Improvement in Processes of Bonding Rails, of which the following is a specification, the principle of the invention being herein explained and the best mode in which I have contemplated applying that principle, so as to distinguish it from other inventions.

The present invention relates to a method of making homogeneous mechanical junctures between two metallic bodies, and is particularly adapted to the joining together of copper bonds and steel rails so as to bring the electrical conductivity of the abutting rails up to the required degree.

The object of the invention is to provide such a "bonding" process that may be carried on in a rapid and efficient manner.

To the accomplishment of these and related ends, said invention, then, consists of the means hereinafter fully described, and particularly pointed out in the claims.

The general process of making a homogeneous mechanical juncture, of which the present process may be regarded as being one specific aspect, is fully described and claimed in a co-pending application of Albert B. Herrick, filed November 25, 1904, Serial No. 234,161. The present process may be regarded as being, in a sense, the adaptation of such general process to the application of bonds of the socket-connected type in contra-distinction to the application of surface-connected bonds. The general process of which the one in hand is thus a specific aspect, is to be distinguished from processes of soldering bonds to rails, whether by electrical or other means; for by a homogeneous mechanical juncture, I mean to designate a union between the metals more intimate than that secured at the low temperature at which solder will melt. In other words, by my present method or process, I am enabled to obtain a true welded joint between the copper of the bond and the steel of the rail, while at the same time, the ease of operation is such that the bonding may be carried on at a much increased rate of speed.

The annexed drawings and the following description set forth in detail certain mechanism embodying the invention, such disclosed means constituting, however, but one of various mechanical forms in which the principle of the invention may be used.

In said annexed drawings:—Figure 1 represents a vertical transverse cross-section of a standard steel rail, with a bond of the type in hand applied thereto and in position for the bonding process; in this figure I have also illustrated a portion of a typical device for holding the bond in place and for providing the external source of heat required for carrying out the process. Fig. 2 represents a front elevation of one of the bonds used in this process, such heating device being illustrated in similar position to that shown in Fig. 1 with respect to a terminal or head on the bond, while the other head of such bond is represented as already affixed or welded to the corresponding rail, the latter appearing in dotted outline only. Fig. 3 is a transverse cross-section of bond and rail, similar to that of Fig. 1, except that the bond terminal is likewise sectioned, and shown as affixed or welded in place. Fig. 4 is a diagrammatic view showing an arrangement of circuit adapted to the carrying on of my improved process. Fig. 5 illustrates a modification in the construction of the apparatus employed in carrying on the process adapting the same to use with a slightly modified form of bond. And Figs. 6, 7, 8, 9 and 10 respectively illustrate other modifications of the apparatus designed for operation in conjunction with still other types of bond.

As has been indicated, the bond, for the affixing of which the present process is more especially designed, is that known as a socket-connected bond, or as they are known to the trade, stud-terminal bonds. Such bonds, as heretofore applied, have depended upon the physical contact between the copper and steel for their electrical connection. In the case where the studs forming the terminals of the bond are solid, a compression stress is applied, sufficient to cause the copper of the terminal to expand and flow laterally until it bears against the annular walls of the hole, wherein such terminal is to be secured; while in the case of tubular stud terminal bonds, a pointed or tapered punch somewhat larger than the diameter of the hole in the terminal, is used to produce the desired expansion. Bonds of the general class just described, viz. socket-connected bonds, may be applied either to the web of the rail, in which case they are generally inclosed by the fish-plates at the joints, or else said bonds are attached to the ball or flange of the rail. The particular mode of attachment adopted is obviously a matter of indifference in the present connection, and while in the several illustrations of apparatus for the carrying on of my improved process, I only show the bond as being applied to the web and to the ball of the rail, it is not meant to imply any limitation of the process to use in these particular connections. For the sake of further diversity moreover, I illustrate the process as adapted to the several different kinds of terminals to which reference has been made, viz. the solid terminal (shown in Figs. 1 to 3 inclusive); a hollow terminal, not entirely perforated, however, (shown in Fig. 5); and a completely perforated, or tubular, terminal (shown in Fig. 6).

Having reference, then, first of all to Figs. 1, 2 and 3, the bond A there illustrated will be seen to represent an approved type of connection for use beneath the fish plates of the rails in the fashion to which allusion has been previously made, the terminals of the bond being in the form of solid studs $a$ and the body $a'$ consisting of laminations formed by winding a narrow strip or strand of copper around and around upon itself. In place of such laminated body structure, a cable or solid rod is frequently employed. In carrying out the present process, the head $a$ of the bond is inserted in an aperture $b$ of the rail B to which it is to be secured, the relative diameters of head and aperture being such as to permit such insertion to be easily made. Thereupon the heating device now to be described is caused to press against opposite ends of said head and the welding operation undertaken. Of such heating device, only those parts are shown as are directly associated in the bonding operation, the parts in question consisting of two movable members or clamp arms $c$ $c'$, a holder $c^2$ removably clamped to the lower end of one of said members, and a block $c^3$ of high resistance material, preferably carbon, adjustably secured in said holder. A suitable source of electricity, as a dynamo C', being provided for passing a current through a circuit including said carbon (see Fig. 4), the latter may be raised to any desired degree of temperature, owing to the resistance interposed by the material of which it is made to the passage of such current therethrough. The actual operation of bonding by the form of the present process illustrated in Figs. 1, 2 and 3 will accordingly be seen to involve clamping the bond terminal between such two members $c$, $c'$ with the carbon block $c^3$ so disposed as to contact with the free end of the terminal stud $a$, while the other member is brought up against the head proper of the bond, and under sufficient pressure to secure good electrical contact therewith. The passage of a heating electric current through the clamping arms $c$ $c'$, the interposed electrode $c^3$ and bond terminal $a$ serves to raise such electrode to a high temperature in which it assumes a more or less incandescent state, and thus to heat the terminal. The latter owing to its relatively high heat conductivity then conducts the heat thus received to the surface of the rail bounding the aperture therein, so that said terminal and such surface are brought to a welding temperature practically simultaneously. At the same time, owing to the pressure exerted from either side upon the terminal by the heating device, and owing to the further fact that in its normal condition said terminal is formed to project a slight distance through the aperture in the rail, the material of the terminal as soon as it becomes sufficiently plastic is pressed radially outward against such bounding surface of the aperture, thus insuring a thorough union between the bond and the rail. The amount of extra material provided in the terminal by reason of its thus extending through the rail is approximately sufficient to take up the space that would otherwise persist between said terminal and the bounding surface of the aperture, so that upon completion of the operation a finished appearance is given the attached bond terminal as shown in Fig. 3.

Where bond A is provided with a hollow terminal $a^2$ in Fig. 5, or a tubular terminal $a^3$, Fig. 6, mechanical means are required for pressing the material of said terminal outwardly into contact with the bounding surface of the aperture instead of relying upon the compression of such material in the confined space provided by the aperture, as is possible with the solid stud terminal illustrated in Figs. 1, 2 and 3. Where the bond terminal is simply hollowed out and not entirely perforated, I provide the inner end of electrode $c^3$ with a projection $c^4$ adapted to enter the recess in the terminal, the function of which will be obvious. Projection $c^4$ is preferably formed separate from the body of the electrode, and may be carried by a disk-like member or button $c^5$ having substantially the same cross sectional area as the electrode, (Fig. 5), or it may bear directly against the electrode (Fig. 6). In this way the liability that would otherwise be present for such projection to break off in case the electrode were not brought up squarely, is in large part overcome. While the same construction of electrode, for obviously the projection $c^4$, with or without button $c^5$ constitutes in effect but a part of said electrode, would be equally well adapted for the tubular form of terminal $a^3$ shown in Fig. 6, I preferably here vary the form of the projection by providing the same with an outer inclined face, and then utilize in connection therewith an additional member in the form of a short block or rod $c^6$ of carbon having a complementary inclined face. When now the material of the terminal becomes plastic, the effect of the pressure of the clamping members upon the opposite ends of the terminal, will be to force members $c^4$, $c^6$ of the electrode past each other, and thus exert the desired outwardly expansive force upon the material of the terminal. With either of the two types of bond illustrated in Figs. 5 and 6, I may, moreover, substitute carbon $c^7$ in a granulated or powdered condition for the solid projection $c^4$ and block $c^6$ (see Fig. 8).

In Fig. 7, I illustrate a known type of bond designed to be laterally attached to the ball of the rail, such attachment in the prevailing practice being secured as heretofore explained, in connection with the general description of the installation of stud terminal bonds. In other words, after the terminal of the bond has been inserted in the blind aperture or recess therefor provided in the rail ball, such terminal is expanded with a riveting hammer or compressor. There is, of course, nothing more than a physical contact between the copper and the steel rail obtained, just as in the case of the other types of bond, when applied in the usual manner. In adapting my present process to this type of bond, the one clamp member $c'$ is brought up against the opposite side of the ball $b^2$ of the rail from that in which the aperture $b'$ is formed; while the other clamping member $c$ that bears the electrode is brought up so as to cause the inner end of the electrode to bear against the bond terminal, in this case the head end of such terminal, instead of the outer free end. As before the conductivity of the terminal is found to be such that the contacting surface of the aperture is brought to a welding temperature practically simultaneously with the terminal, so that a homogeneous juncture of the terminal with the rail is secured in contradistinction to the mere physical contact heretofore obtained. The bond terminal may be tubular here also, in which case a modification in the electrode is made similar to that shown in the preceding figures (see Fig. 9).

In Fig. 10, finally, I show the adaptation of my process to the welding of stud-terminal bonds in a horizontal position, as for example to the flange of a rail, although the specific form of rail B' there illustrated is that largely employed in the conduits of underground trolley systems. Where the bond is to be attached in such horizontal position, the terminal is preferably introduced from below through the aperture $b^4$ in the rail flange $b^5$, said terminal as before being preferably allowed to project a short distance through the aperture. The electrode C', comprising simply a flat block of carbon, is then rested on the upper projecting end of a block or rather plug $c^8$, it being unnecessary to apply very much pressure. Such plug is shown as tapered, whereby the desired radial expansion of the material is obtained. In practicing this form of the process, I find that it is feasible to heat the terminal beyond the welding temperature so as to even fuse the same, if desired.

It will, accordingly, be observed that in each of the several applications of my improved process, the heat is for the most part applied to or concentrated upon the bond terminal, the incandescent electrode being regarded in its general aspect simply as an external heat source. Such bond terminal then conducts the heat thus received to the portion of the rail that it is desired immediately to affect, and being of a character such as to permit this conduction at a very rapid rate, more rapidly, in other words, than the heat can be dissipated through the rail, it is found that the contacting superficies of the two bodies are raised practically simultaneously to the required welding temperature. This it will be obvious is accomplished without the loss of time and waste of energy that would be incidental to the raising to such temperature of the entire section of rail adjacent to the portion to which the bond is to be attached.

In the foregoing description of my process, I have made no reference to the use of either braze, flux or other cementing material; it will of course be understood that the introduction of any such material is optional with the user, and if in certain cases it be found to facilitate the operation, would be recommended. It is not necessary, however, to the securing of a thorough union between the materials, and so need be referred to only in this incidental fashion.

It will be understood, in conclusion, that in referring herein to the material of the bond terminal as being pressed radially outward against the bounding aperture in the rail, I include equally, the various previously described ways in which this pressure is obtained; whether by the contact of the electrode against the projecting outer end of the solid bond terminals of Figs. 1 and 7, or that of the projection ($c^4$, $c^7$, $c^8$) against the inner walls of the hollow terminals of Figs. 5, 8, 9 and 10, or that of rod $c^6$, acting in conjunction with such a projection, against the inner walls of the tubular terminal of Fig. 6.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of uniting metal bodies, which consists in inserting a terminal of one body in an aperture in the other body, thereupon applying heat from an external source to such terminal, whereby such terminal and the surface of the second body bounding the aperture therein are brought to a welding temperature, and simultaneously pressing the material of such terminal against such bounding surface, substantially as described.

2. The method of uniting metal bodies, which consists in inserting a terminal of one body in an aperture in the other body, thereupon applying heat from an external source to such terminal, whereby such terminal and the surface of the second body bounding the aperture therein are brought to a welding temperature, and simultaneously pressing the material of such terminal from within radially outward against such bounding surface, substantially as described.

3. The method of homogeneously uniting metal bodies having unlike heat conductivities, which consists in inserting a terminal of the body of greater heat conductivity in an aperture in the other body, thereupon applying heat from an external source to such terminal, whereby such terminal and the surface of the second body bounding the aperture therein are brought to a welding temperature, and simultaneously pressing the material of such terminal against such bounding surface, substantially as described.

4. The method of homogeneously uniting metal bodies having unlike characteristics as to fusibility, the more readily fusible body having also the greater heat conductivity, which consists in inserting a terminal of the first or more readily fusible body in an aperture of the second body, thereupon applying heat from an external source to such terminal, whereby such terminal and the surface of the second body bounding the aperture therein are brought to a welding temperature, and simultaneously pressing the material of such terminal radially outward against such bounding surface, substantially as described.

5. The method of homogeneously uniting metal bodies of unlike masses and different temperatures of fusion, the smaller mass having both the lower temperature of fusion and the greater heat conductivity; which consists in inserting a terminal of said first or smaller body in an aperture in the second body; thereupon applying heat from an external source to such terminal; thereby effectively heating the surface of said second body bounding the aperture therein by conduction through such terminal, whereby such terminal and bounding surface are brought to a welding temperature; and simultaneously pressing the material of such terminal from within radially outward against such bounding surface, substantially as described.

6. The method of homogeneously uniting metal bodies having unlike characteristics as to fusibility, the more readily fusible body having also the greater heat conductivity; which consists in inserting a terminal of the first or more readily fusible body in an aperture in the second body at the desired point of union; directly heating such terminal by pressing an electrode of high resistance against the same and thereupon passing a heating electric current through said electrode until a high temperature is produced; thereby effectively heating the surface of the second body bounding the aperture therein by conduction through such terminal, whereby such terminal and bounding surface are brought to a welding temperature; and simultaneously pressing the material of such terminal from within radially outward against such bounding surface, substantially as described.

7. The method of homogeneously uniting metal bodies having unlike masses and different temperatures of fusion, the smaller mass having both the lower temperature of fusion and the greater heat conductivity; which consists in inserting a terminal of said smaller body in an aperture in said larger body at the desired point of union; directly heating such terminal by pressing an electrode of high resistance against the same and then passing a heating electric current through said electrode until a high temperature is produced; thereby effectively heating the surface of said larger body bounding the aperture therein by conduction through such terminal, whereby such terminal and bounding surface are brought to a welding temperature; and simultaneously pressing the material of such terminal from within radially outward against such bounding surface, substantially as described.

8. The method of homogeneously uniting metal bodies having unlike characteristics as to fusibility, the more readily fusible body having also the greater heat conductivity; which consists in inserting a terminal of the first or more readily fusible body in an aperture in the second body at the desired point of union; directly heating such terminal by pressing an electrode of high resistance against the same and thereupon passing an electric current through said electrode and terminal, such current being adapted to produce a high temperature in said electrode; thereby effectively heating the surface of the second body bounding the aperture therein from the same electrode by conduction through the first body, whereby such terminal and bounding surface are brought to a welding temperature; and simultaneously pressing the material of such terminal from within radially outward against such bounding surface, substantially as described.

9. The method of homogeneously uniting metal bodies of unlike masses and different temperatures of fusion, the smaller mass having both the lower temperature of fusion and the greater heat conductivity; which consists in inserting a terminal of said smaller body in an aperture in said larger body at the desired point of union; directly heating such terminal by pressing an electrode of high resistance against the same and then passing an electric current through said electrode and terminal, such current being adapted to produce a high temperature in said electrode; thereby effectively heating the surface of said larger body bounding the aperture therein from the same electrode by conduction through such terminal, whereby such terminal and bounding surface are brought to a welding temperature; and simultaneously pressing the material of such terminal from within radially outward against such bounding surface, substantially as described.

10. The method of homogeneously uniting a bond to a rail, which consists in inserting a terminal of the bond in an aperture in the rail at the desired point of union; directly heating such terminal by pressing an electrode of high resistance against the same and then passing an electric current through said electrode and terminal, such current being adapted to produce a high temperature in said electrode; thereby effectively heating the surface of said rail bounding the aperture therein from the same electrode by conduction through such terminal, whereby such terminal and bounding surface are brought to a welding temperature; and simultaneously pressing the material of such terminal from within radially outward against such bounding surface, substantially as described.

Signed by me, this 8th day of June, 1909.

WILLIAM B. CLEVELAND.

Attested by—
  Anna L. Gill,
  Jno. F. Oberlin.